US 9,292,097 B1

(12) United States Patent
Miller et al.

(10) Patent No.: US 9,292,097 B1
(45) Date of Patent: *Mar. 22, 2016

(54) GESTURE-BASED SMALL DEVICE INPUT

(71) Applicant: Google Inc., Mountain View, CA (US)

(72) Inventors: James B. Miller, Sunnyvale, CA (US); Richard C. Gossweiler, III, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/093,914

(22) Filed: Dec. 2, 2013

Related U.S. Application Data

(63) Continuation of application No. 12/258,009, filed on Oct. 24, 2008, now Pat. No. 8,624,836.

(51) Int. Cl.
G06F 3/033 (2013.01)
G06F 3/01 (2006.01)

(52) U.S. Cl.
CPC ........................................ G06F 3/017 (2013.01)

(58) Field of Classification Search
CPC ... G06F 3/0418; G06F 3/0421; G06F 3/0425; G06F 3/0426; G06F 3/044; G06F 3/04883; G06F 3/04886; G06F 1/163; G06F 1/169; G06F 2203/04101
USPC ............ 345/8, 102, 156–179, 204, 213, 418, 345/581, 589, 629; 73/495; 455/566.1; 361/728; 600/462, 540
See application file for complete search history.

(56) References Cited

U.S. PATENT DOCUMENTS

| | | | | |
|---|---|---|---|---|
| 5,053,757 A | * | 10/1991 | Meadows | G06F 3/044 341/22 |
| 5,305,181 A | * | 4/1994 | Schultz | 361/679.03 |
| 5,479,190 A | * | 12/1995 | Rowe | 345/156 |
| 6,144,366 A | | 11/2000 | Numazaki et al. | |
| 6,734,685 B2 | * | 5/2004 | Rudrich | H03K 17/962 324/661 |
| 6,850,224 B2 | * | 2/2005 | Baughman | 345/163 |
| 7,023,426 B1 | | 4/2006 | Robinson | |
| 7,028,547 B2 | * | 4/2006 | Shiratori et al. | 73/495 |
| 7,030,840 B2 | | 4/2006 | Mametsuka | |
| 7,038,659 B2 | | 5/2006 | Rajkowski | |
| 7,809,160 B2 | * | 10/2010 | Vertegaal et al. | 382/103 |
| 8,011,582 B2 | | 9/2011 | Ghafarzadeh | |
| 8,036,428 B2 | | 10/2011 | Lin et al. | |
| 8,805,441 B1 | * | 8/2014 | Nasserbakht | G06F 15/7807 455/556.1 |
| 8,830,181 B1 | * | 9/2014 | Clark et al. | 345/173 |
| 2002/0033803 A1 | | 3/2002 | Holzrichter et al. | |
| 2003/0026171 A1 | * | 2/2003 | Brewer et al. | 368/82 |
| 2003/0067447 A1 | * | 4/2003 | Geaghan | G06F 3/0416 345/173 |

(Continued)

OTHER PUBLICATIONS

Arnaut, *Input Devices*, Academic Press, Inc., 1988, 5 pages.

(Continued)

*Primary Examiner* — Prabodh M Dharia
(74) *Attorney, Agent, or Firm* — Fish & Richardson P.C.

(57) ABSTRACT

A computer-implemented method is described that includes providing a watch defining a body and a watch face on a surface of the body, the body having one or more sensors arranged to sense user inputs in an area adjacent to the body. The method further comprises sensing a motion of an object in the area adjacent to, but not touching, the body using the one or more sensors and changing a display of a pointing element on a graphical user interface on the watch in coordination with the sensed motion.

22 Claims, 7 Drawing Sheets

(56) References Cited

U.S. PATENT DOCUMENTS

| | | | |
|---|---|---|---|
| 2003/0146887 A1 | 8/2003 | Mametsuka | |
| 2004/0017355 A1* | 1/2004 | Shim | G06F 3/03547 345/157 |
| 2004/0021633 A1 | 2/2004 | Rajkowski | |
| 2004/0155870 A1 | 8/2004 | Middleton | |
| 2005/0004496 A1 | 1/2005 | Pilu et al. | |
| 2005/0099389 A1 | 5/2005 | Ma et al. | |
| 2005/0099390 A1 | 5/2005 | Ma et al. | |
| 2005/0156889 A1 | 7/2005 | Ma et al. | |
| 2005/0253806 A1 | 11/2005 | Liberty et al. | |
| 2006/0177227 A1 | 8/2006 | Blasko et al. | |
| 2006/0195020 A1 | 8/2006 | Martin et al. | |
| 2006/0244722 A1 | 11/2006 | Gust | |
| 2007/0285400 A1* | 12/2007 | Lu | 345/173 |
| 2008/0084385 A1 | 4/2008 | Ranta et al. | |
| 2008/0097221 A1 | 4/2008 | Florian | |
| 2008/0167535 A1 | 7/2008 | Stivoric et al. | |
| 2008/0191864 A1* | 8/2008 | Wolfson | G06F 3/011 340/524 |
| 2008/0283651 A1* | 11/2008 | Ito | A45F 5/004 242/386 |
| 2008/0284176 A1* | 11/2008 | Fraenkel | 290/54 |
| 2009/0040193 A1* | 2/2009 | Geaghan | G06F 3/0416 345/174 |
| 2009/0051649 A1 | 2/2009 | Rondel | |
| 2009/0059730 A1 | 3/2009 | Lyons et al. | |
| 2009/0128448 A1* | 5/2009 | Riechel | 345/8 |
| 2009/0131165 A1 | 5/2009 | Buchner et al. | |
| 2009/0273573 A1* | 11/2009 | Hotelling | 345/173 |
| 2010/0016990 A1 | 1/2010 | Kurtz | |
| 2010/0073318 A1* | 3/2010 | Hu | G06F 3/044 345/174 |
| 2010/0130873 A1* | 5/2010 | Yuen | A61B 5/0205 600/484 |
| 2010/0152600 A1* | 6/2010 | Droitcour | A61B 5/05 600/534 |
| 2010/0219943 A1* | 9/2010 | Vanska | G06F 1/163 340/407.1 |
| 2010/0302137 A1* | 12/2010 | Benko | G06F 3/005 345/156 |
| 2010/0321899 A1 | 12/2010 | Vossoughi et al. | |
| 2011/0205156 A1 | 8/2011 | Gomez et al. | |
| 2012/0216139 A1* | 8/2012 | Ording et al. | 715/773 |

OTHER PUBLICATIONS

Atkins, *Digital Waveguide Touch™—A New Touch Screen Platform*, RPO, Inc., 2007, pp. 1-6.

"Bluetooth—The i.Tech Virtual Keyboard" [online]. Golan Technology, [retrieved on Nov. 25, 2008]. Retrieved from the Internet: <URL: http://www.vkb-support.com/learn_more.php>. 4 pages.

Butler, "SideSight: Multi-"touch" Interaction Around Small Devices," UIST 2008, pp. 201-204.

Hinckley, "Sensing Techniques for Mobile Interaction," *CHI Lettrs*, 2(2):91-100 UIST 2000.

Hollemans, "Entertable: Multi-user multi-object concurrent input," UIST 2006 Adjunct Proceedings: Demonstrations, 2006, pp. 55-56.

Howard and Howard, "Ubiquitous Computing Enabled by Optical Reflectance Controller" [online]. Lightglove, Inc, [retrieved on Nov. 25, 2008]. Retrieved from the Internet: <URL: http://www.lightglove.com/White%20Paper.htm>. 8 pages.

Smith, "Electric Field Sensing for Graphical Interfaces," IEEE Xplore, 1998, pp. 54-60.

"The i.Tech Virtual Keyboard" [online]. Golan Technology, [retrieved on Nov. 25, 2008]. Retrieved from the Internet: <URL: http://www.vkb-support.com/index.php>. 1 page.

Vogel, "Shift: A Technique for Operating Pen-Based Interfaces Using Touch," CHI 2007 Proceedings, Mobile Interaction Techniques, 2007, pp. 657-666.

Wigdor, "LucidTouch: A See-Through Mobile Device," UIST 2007, 2007, pp. 269-278.

Krueger et al. "Videoplace—An Artificial Reality." CHI '85 Proceedings , Apr. 1985, pp. 35-40.

\* cited by examiner

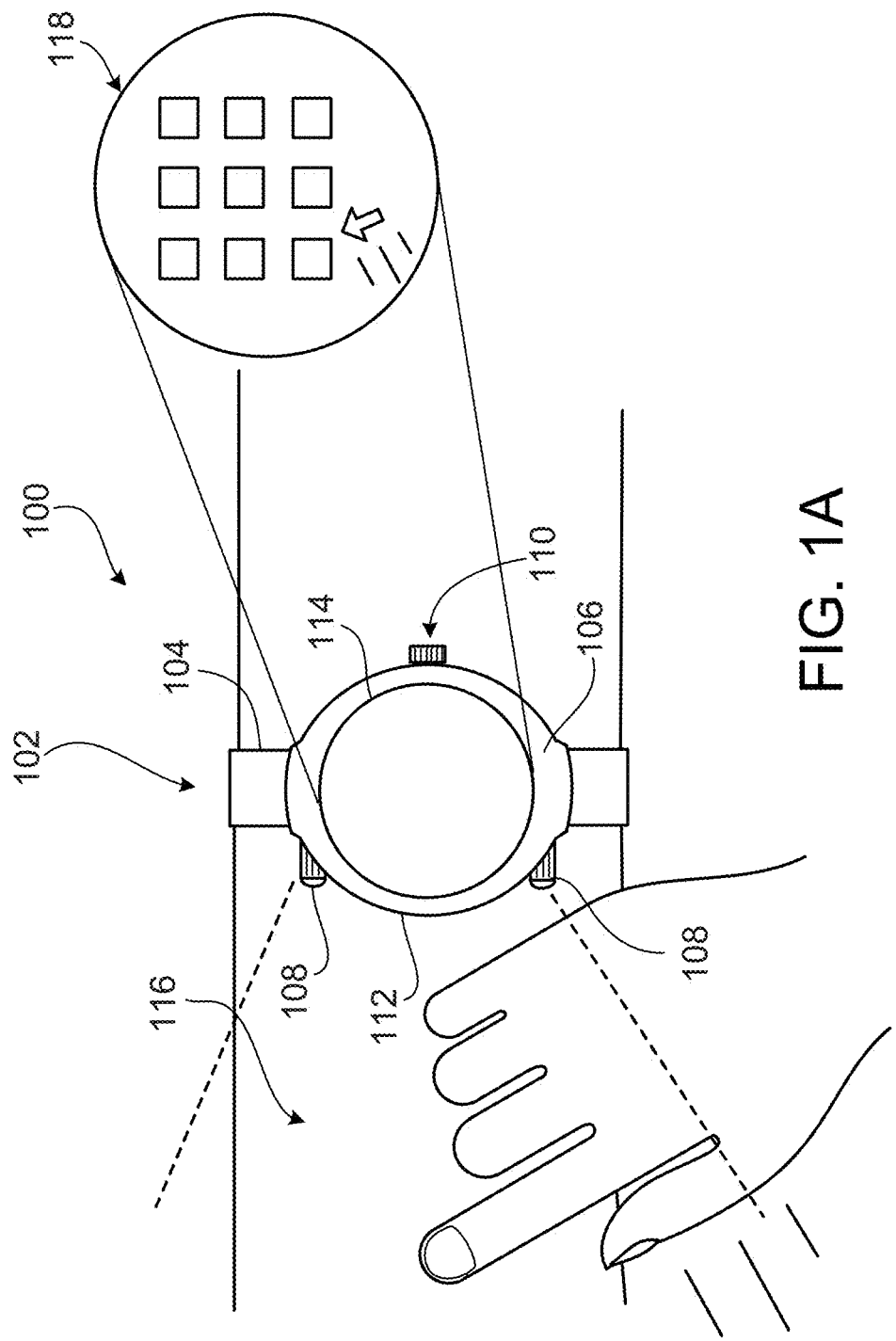

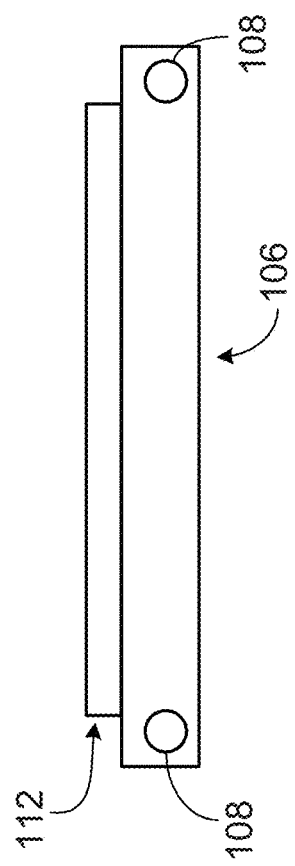

GESTURE-BASED SMALL DEVICE INPUT

CROSS-REFERENCE TO RELATED APPLICATIONS

This application is a continuation of and claims priority to U.S. application Ser. No. 12/258,009, filed on Oct. 24, 2008, the entire contents of which are hereby incorporated by reference.

TECHNICAL FIELD

This instant specification relates to input devices for computers.

BACKGROUND

As computer processors have decreased in size and expense, mobile computing devices have become increasingly widespread. Designed to be portable, many mobile computing devices are lightweight and small enough to be worn or carried in a pocket or handbag. However, the portability of modern mobile computing devices comes at a price: today's mobile computing devices often incorporate small input devices to reduce the size and weight of the device. For example, many current mobile devices include small QWERTY keyboards that many people (especially those with poor dexterity) find difficult to use.

SUMMARY

In general, this document describes a gesture-based interface for small computing devices. For example, a wearable computing device (e.g., a watch) may include a plurality of sensor-emitter pairs that can create a virtual mouse pad on a user's forearm, wrist, or the back of the user's hand. When the user moves an object (e.g., a finger or stylus) in the virtual mouse pad area, a corresponding movement or action may take place in the device's graphical user interface ("GUI"). For instance, as the user moves his finger in the virtual mouse pad, the GUI's pointing device may track the movement of the user's finger. In some implementations, placing an object in the virtual mouse pad may result in the GUI performing an action associated with the object. For example, placing a key in the virtual mouse pad may unlock the device, allowing further device inputs.

In one implementation, a computer-implemented method is described that includes providing a watch defining a body and a watch face on a surface of the body, the body having one or more sensors arranged to sense user inputs in an area adjacent to the body. The method further comprises sensing a motion of an object in the area adjacent to, but not touching, the body using the one or more sensors and changing a display of a pointing element on a graphical user interface on the watch in coordination with the sensed motion.

In some aspects, sensing the motion of the object comprises sensing an intensity level of light reflected off the object. Also, one sensor can be vertically offset from another sensor and vertical motion can be used to generate a clicking event. In addition, the one or more sensors can include at least two light sources and two light sensors. Furthermore, an accelerometer input from an accelerometer can generate a clicking event. Moreover, the watch may include a CCD camera and a light emitting diode.

In another implementation, a pointing system comprising a device having a body defining an upper face and an outer periphery is disclosed. The system may include one or more sensors arranged to sense user inputs in an area adjacent to, but not touching, the body. The system may also include a processor in the device, attached to the one or more sensors, to change a display of a pointing element on a graphical user interface on the device in coordination with sensed user input.

In certain aspects, the sensors can be mounted in an outer periphery of the body and one sensor may be vertically offset from another sensor. Also, the one or more sensors can include at least two light sources and two light sensors. In addition, the processor can use accelerometer input from an accelerometer to generate a clicking event.

The systems and techniques described here may provide one or more of the following advantages. First, the systems may allow a user to interact with a GUI without obscuring parts of the GUI (particularly when the GUI is on a very small screen). Second, the system may increase the gesture vocabulary of a device. Third, the system may provide gesture-based input without requiring a separate piece of equipment.

The details of one or more embodiments of the gesture-based small device input feature are set forth in the accompanying drawings and the description below. Other features and advantages of the gesture-based small device input feature will be apparent from the description and drawings, and from the claims.

DESCRIPTION OF DRAWINGS

FIG. 1A is a conceptual diagram of gesture-based small device input.

FIG. 1B shows an illustrative placement of sensor-emitter pairs on a gesture-based small input device.

Like reference symbols in the various drawings indicate like elements.

DETAILED DESCRIPTION

Figure 2:
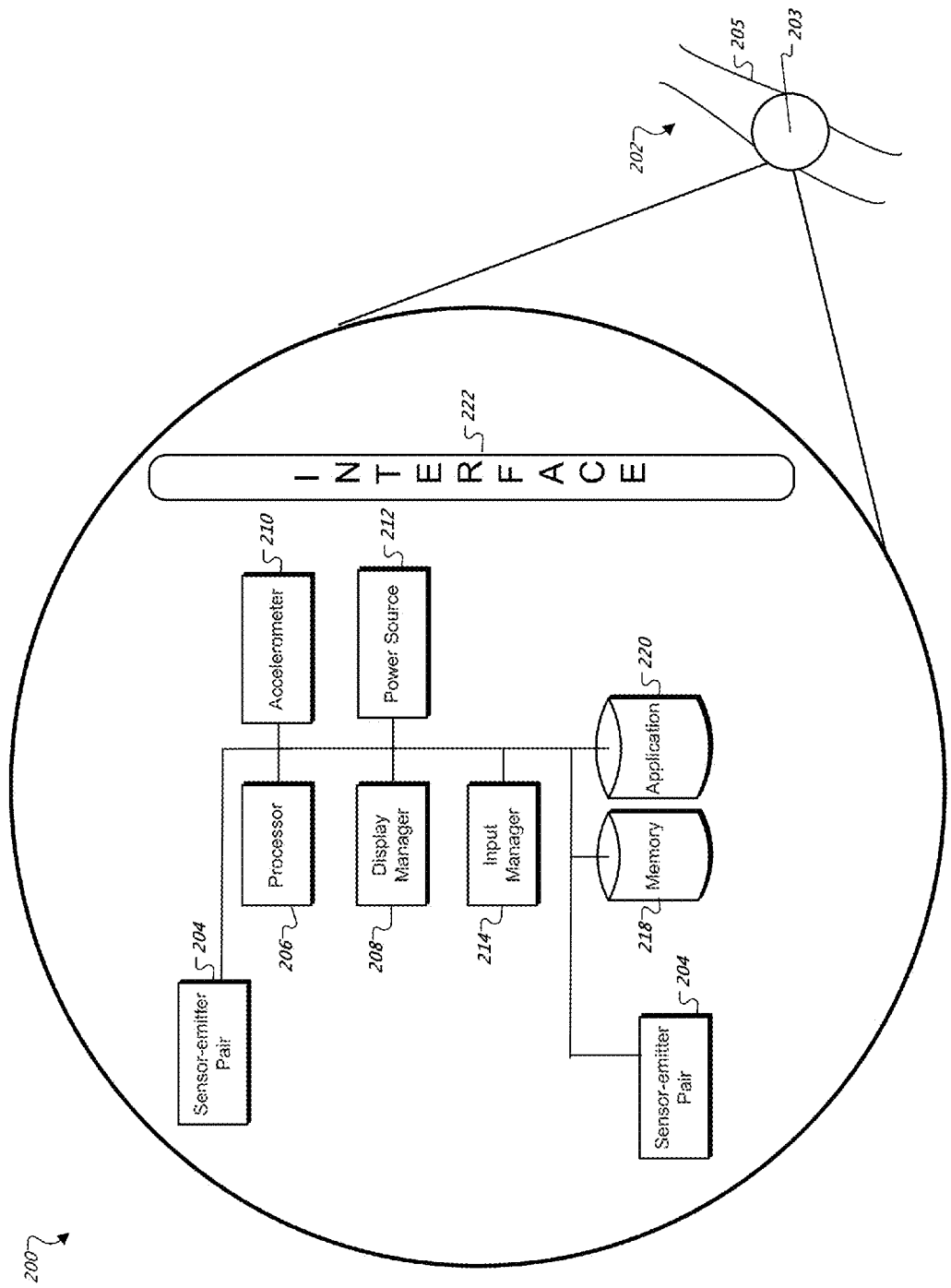
FIG. 2 shows a block diagram of an illustrative gesture-based small input device.

This document describes systems and techniques for providing gesture-based input to small devices. In general, a computer processor incorporated into a portable device (e.g, a wristwatch or cellular phone) can receive inputs from one or more sensor-emitters pairs integrated into the body of the device. The sensor-emitter pairs may detect inputs in an area adjacent to the device and provide these inputs to the processor. The processor may then translate the inputs into GUI commands. For example, a wristwatch strapped to a user's wrist may include various sensor-emitters that define a detection area on the user's wrist and forearm. Movements in the detection area can be identified by the sensor-emitter pairs and passed to the wristwatch's processor. The processor may convert the detected movements into GUI actions such as pointer drags, taps, etc.

FIG. 1A is a conceptual diagram 100 of gesture-based small device input. The diagram 100 shows a wearable computing device 102 strapped to a user's body by a band 104. In an illustrative example, the device 102 may be a watch, but in other implementations the device may be a cellular telephone, personal digital assistant, portable media player, or other portable computing device. Also, functionality from more than one such type of apparatus may be incorporated into the device 102.

The illustrative computing device 102 may include a GUI produced by a computer operating system that permits a user to interact with the computing device 102. In some implementations, the GUI may include one or more graphical components such as windows, icons, menus, or pointing devices that allow a user to interact with an operating system running on the device. The GUI may display a desktop environment where interaction with the environment can be controlled through use of an input device. For example, the computing device 102 may contain a plurality of sensor-emitter pairs 108 in the side of a device housing that can create a detection area 116 adjacent to the device 102. In an illustrative example, a user may control the GUI by placing an object, such as the user's finger or a stylus, in the detection area 116. As shown in the in the conceptual diagram 100, as a user moves his finger in the detection area 116, the GUI's pointing device may follow a parallel path in the GUI, as shown in an expanded view 118 of the screen 114.

The illustrative device 102 may also be able to identify objects placed in the detection area and perform a GUI action associated with the objects. For example, a small cube may have images of a calendar, envelope, and a globe on some of its sides. Placing the picture of the calendar in the detection area 116 may cause the device to load and execute a calendar application. Similarly, placing the envelope or globe side of the cube in the detection area 116 may result in the device running an email or map application. In some implementations, placing an object such as a business card or barcode in the detection area 116 may cause the device 102 to perform a web search for information related to the object.

In some implementations, the GUI can process complex, multi-input interactions detected by the sensor-emitter pairs 108. For example, the GUI may process actions such as pinching and rotating motions by a user's fingers that are detected by sensor-emitter pairs 108. For example, users may select documents in the GUI by pinching a location in the detection area 116 corresponding to the documents and rotate the selected documents by rotating their fingers in the detection area 116.

In some implementations, the computing device 102 may use visible light to provide the user an indication of the dimensions of the detection area 116. For example, an emitter in the sensor-emitter pairs 108 (e.g., an LED) may produce visible light. In other implementations, a separate visible light source may be placed adjacent to the sensor-emitter pairs 108. The area illuminated by the light source may approximate the detection area of the sensor-emitter pairs. The illumination area may facilitate interacting with the device because the illumination area may provide the user with a rough estimate of the contours of the detection area.

In other implementations, the computing device 102 may superimpose an image onto the detection area 116 to further facilitate user interaction with the GUI. For instance, in some implementations, the computing device 102 may superimpose the image of a QWERTY keyboard on the detection area. When a user presses a button on the virtual keyboard, a corresponding input can be registered by the GUI. For example, if the user selects the "A" button in the virtual keypad, an "A' can be entered in the GUI.

The device 102 may also include a screen 114 that, in some implementations, can be a touch screen. The illustrative touch screen 114 can allow a user to interact with the graphical components by translating screen presses into corresponding GUI actions. For example, dragging an input device (e.g., a finger, stylus, etc.) across the touch screen can cause the pointing device to mimic the movement of the input device. Similarly, tapping the screen may cause a right-click or other action to occur at the location of the tap.

The illustrative touch screen 114 may be a resistive panel comprised of several layers. Such a resistive screen may be relatively inexpensive and may be unaffected by outside elements such as dirt and dust. In other implementations, the screen 114 may be a capacitive screen as such screens may also be largely immune to outside elements and have high clarity. Other implementations may use surface acoustic wave technology or other touch screen technology.

The illustrative touch screen 114 may be surrounded by a bezel 112. In some implementations, the bezel may rotate 360 degrees in a clockwise or counterclockwise direction. Both the bezel 112 and the screen 114 may be supported by a frame 106, which may be connected to the band 104.

In addition to allowing a user to strap the device 102 to his body, in some implementations the band 104 may include one or more sensors that can be used to provide input to the GUI. For example, in some implementations a user can move the GUI's pointing device by pressing his finger on the strap and dragging his finger along the strap in the desired direction. In another illustrative example, the user may right-click on an item in the GUI by dragging the pointing device to the desired application as described above and pressing into the strap for a predetermined amount of time. In another illustrative example, the computing device 102 may be a portable music player strapped to the user's upper arm. In the illustrative example, the user may press the strap to skip to the next track or slide his finger back and forth on the strap to fast forward or rewind the currently playing track.

In such situations, the inputs may be sensed by a flexible area of the band 104 that includes a capacitive touch sensor or other similar sensor. Inputs of a user pushing in the middle of the sensor and the rolling their fingertip up, down, right, or left slight may change the capacitance in the sensor in measurable ways, so that such slight movements may be interpreted as gestures to move a pointer or cursor on a GUI.

The illustrative device 102 may also include a crown 110 that may be attached to the frame 106. The crown 110 may allow the user to adjust the display of the computing device 102. For example, a user may want the computing device to display the time. In some implementations, by pressing the crown 110, the user may toggle the computing device interface between a display comprising a dial having hour, minute, and second hands and the computing device's GUI.

In some implementations, the crown 110 may extend out from the device 102 and swivel about its axis (e.g., when it has been pulled out from the device 102 body, much like pulling a stem out in order to switch from a winding mode to a time setting mode on a traditional analog mechanical watch). Sensors at the base of the crown 110 may be positioned to sense motion of the crown 110 in various directions, much like what occurs with a joystick input mechanism. Manipulating the crown 110 may allow the user to control the GUI. For example, a user may extend the crown 110 and twist it to move between GUI applications. In some implementations, the crown 110 may allow a user to control the GUI's pointing device. The crown may act as a mouse; e.g., a user may control the pointing device by moving the crown in the desired direction.

In other implementations, manipulation of the crown 110 may control which sensor-emitter pairs are active. For example, in some implementations, sensor-emitter pairs 108 may be embedded in the frame on the side of the crown 110 and on the side of the frame opposite the crown, creating two detection areas: the detection area 116 on the user's forearm and another detection area (not shown) projected on the back of the user's hand. In the illustrative example, the user may use the crown 110 to determine which of the detection areas are active. For example, the user may press the crown once to activate the left detection area 116 or twice to activate a right detection area. In other implementations, twisting the crown 110 a specified number of full revolutions can similarly turn the detection areas on and off.

FIG. 1B shows an illustrative placement of sensor-emitter pairs 108 on a gesture-based small input device 102. As shown in FIG. 1B, in some implementations, the sensor-emitter pairs 108 may be vertically offset from one another, which may allow the sensor-emitter pairs to detect tapping motions in the detection area. For example, by determining when each sensor-emitter pair detects an object in the detection area 116, the GUI may be able to determine what type of input was intended, e.g., tap, press, etc. In particular, a higher sensor or higher emitter may trigger before a lower sensor or emitter, thus indicating that a user has moved their finger downward. If the triggering then occurs quickly in the opposite order, the device may determine that the user has performed a tapping action.

In some implementations, the sensor-emitter pairs 108 may be included in the rotatable bezel 112 located, in the illustrative example, on top of the frame 106. This may allow a user to choose where the detection area created by the sensor-emitter pairs 108 is defined. For example, as noted above, in some implementations the bezel 112 may rotate 360 degrees in either direction. Because, in the illustrative example, the sensor-emitters 108 are included in the bezel 112, the sensor-emitter pairs 108 are also rotated when the user rotates the bezel 112, allowing the user to adjust the position of the detection area 116. This may be useful, for example, when a user moves the computing device from one hand to the other (e.g., to match users who are right-handed or left-handed) because the user can adjust the bezel 112 so that the detection area 116 is placed on his forearm.

FIG. 2 shows a block diagram 200 of an illustrative gesture-based small input device. The device 202 may include multiple sensor-emitter pairs 204; although two sensor-emitter pairs are illustrated, any appropriate number of sensor-emitter pairs may be used. In an illustrative implementation, the sensor-emitter pairs 204 may each include a LED and a photodiode. The LED may illuminate a detection area adjacent to the computing device 204, while the photodiode may detect objects entering the detection area by measuring the amount of light reflected from such objects.

In another example, the sensor-emitter pairs 204 can include a capacitive sensor. Because capacitive sensors can be relatively inexpensive and give high resolution measurements, capacitive sensors can be useful when cost is a factor and there is a small gap between the sensor and potential targets.

In some implementations, the sensor-emitter pair 204 may include an inductive sensor. Because inductive sensors are generally insensitive to certain contaminants (e.g., water, oil, and dirt) and able to withstand shocks and vibrations, inductive sensors may be useful when the illustrative computing device is subject to less than ideal environmental conditions.

In other implementations, the sensor-emitter pair 204 may include an infrared sensor. Infrared sensors may be relatively inexpensive, and infrared energy may be able to pass through some opaque materials; thus, infrared sensors may be advantageous when cost is a factor or when the sensor is covered by an opaque material, e.g., an opaque protective cover.

In an alternative implementation, the sensor-emitter pair 204 may include a camera. For example, the camera can be a low-cost camera such as charge-coupled device ("CCD") or a complementary metal-oxide ("CMOS") camera. A camera may allow the computing device 202 to recognize more complex inputs. For example, the camera may capture images of multi-finger inputs that a processor may later convert into GUI actions.

In some implementations, various sensing technologies may be used in combination with one another. For example, the sensor-emitter pair 204 may include an ultrasound device as well as a camera or photodiode. Combining sensing technologies in this manner may allow the device 202 to obtain better readings under non-ideal conditions. For example, in low-light situations, the ultrasound device may augment (or, if appropriate, replace) the reading produced by another device such as a camera.

The device 202 may include a processor 206 that executes instructions stored in memory 218. The processor 206 may comprise multiple processors responsible for coordinating interactions among other device components and communications over an I/O interface 222. The processor 206 may be responsible for managing internal alerts generated by the device 202. For example, an accelerometer 210 may alert the processor 206 when the accelerometer 210 detects movement. The processor 206 may determine which applications running on the device 202 are to be notified about such an activity.

A display manager 208 is provided to supervise and coordinate information to be shown on a touch screen display 203. The display manager 208, for example, may be provided with data relating to information to be displayed and may coordinate data received from various different applications or modules. As one example, display manager 208 may receive data for overlapping windows on a windowed display and may determine which window is to be on top and where the lower window or windows is to be cut.

An accelerometer 210 may be provided for use in a variety of manners. For example, the accelerometer may be used to determine the state the machine is currently experiencing, so as to provide a proper display to the user. For example, if the accelerometer 210 indicates that the device 202 has not been moved for a substantial period of time, the device may display the current time instead of the GUI or shut parts of the device down to conserve power. In some implementations, movements detected by the accelerometer 210 may used to generate right-clicks or taps. The accelerometer can also be used to recognize gestures and body movements (e.g., a virtual pedometer).

The accelerometer 210 may cooperate with other input devices to enhance the device's 202 user interface. For example, input from the accelerometer 210 may be used in conjunction with gesture-based input to control some applications. For example, in a web browsing application a user may center a web page on a particular part of the page by pressing and holding a spot in the detection area. Then as the user moves the device 202, the accelerometer 210 may provide movement data to the browsing application, allowing the browser to shift the current view of the page such that the selected point is still in view. This may be useful, for example, in a mapping application where a user wants to see the area surrounding a point in the map without navigating away from the point of interest.

Device inputs such as presses on the touch screen 203 and inputs detected by the sensor-emitter pairs may be processed by an input manager 214. For example, the input manager 214 may receive information regarding input provided by a user on touch screen 203, and forward such information to various applications or modules. For example, the input manager 214 may cooperate with the display manager 208 so as to understand what onscreen elements a user is selecting when they press on the touch screen 203.

The input manager 214 may also process gesture-based inputs detected by the sensor-emitter pairs 204. For example, the input manager 214 may determine where in the detection area an input occurred and translate the detected input into a GUI action. The input manager 214 may also help coordinate movements detected by the accelerometer 210 or inputs to a sensor incorporated into a strap or watch band 205.

The device may also include one or more power sources 212. The illustrative power source may, in some implementations, be either a disposable or rechargeable battery. For example, the battery may be one of myriad types of disposable batteries: zinc-carbon, zinc-chloride, alkaline, silver-oxide, lithium-thionyl chloride, mercury, zinc-air, thermal, water-activated, nickel-oxyhydroxide, etc. In some implementations, the power source 212 may be a type of rechargeable battery such as nickel-cadmium, nickel-metal hydride, lithium ion, lithium ion polymer, rechargeable alkaline battery, or types of rechargeable batteries. In some cases, the device may contain one or more solar cells that can be used to recharge the battery. In some implementations, the one or more solar cells may be placed in the face of the device.

In some implementations, the power source 212 may comprise an AC/DC power supply that can convert an external AC signal to a DC voltage signal that meets the operating requirements of the device components. In some implementations, the power source 212 may be charged through either contact or non-contact charging.

The device also includes memory 218. The memory 218 may comprise random access memory where computer instructions and data are stored in a volatile memory device for execution by the processor 206. The memory 218 may also include read-only memory where invariant low-level systems code or data for basic system functions such as basic input and output, and startup instructions reside. In addition, the memory 218 may include other suitable types of memory such as programmable read-only memory, erasable programmable read-only memory, electrically erasable programmable read-only memory, hard disks, and removable memory such as microSD cards or Flash memory.

Memory 218 may store commands or objects for a collection of actions that correspond to inputs detected by the sensor-emitter pairs 204. For example, memory 218 may store a collection of object images and corresponding actions. In some implementations, when an image is captured by the sensor-emitter pairs 204, objects in the image may be compared with the collection of object images stored in memory. If a match is found, the device 202 may perform the action (or actions) associated with the object.

A variety of applications 220 may operate, generally on a common microprocessor 206, on the device 202. The applications 220 may take a variety of forms, such as mapping applications, e-mail and other messaging applications, web browser applications, and various applications running within a web browser or running extensions of a web browser.

The device 202 may communicate with other devices through an input/output interface 222. The interface 222 may manage communications with a wireless network. The interface 222 may provide for communication by the device 202 with messaging services such as text messaging, e-mail, and telephone voice mail messaging. In addition, the interface 222 may support downloads and uploads of content and computer code over a wireless network. The interface 222 may provide for voice communications in a wireless network in a familiar manner.

Figure 3:
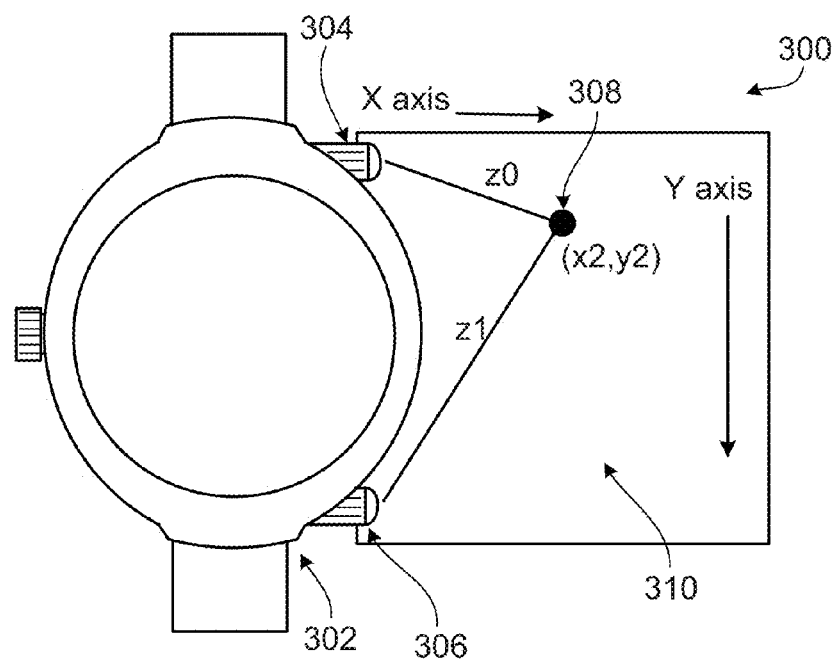
FIG. 3 shows a conceptual diagram illustrating the calculation of X-Y coordinates for a detected object.

FIG. 3 shows a conceptual diagram 300 illustrating the calculation of X-Y coordinates for a detected object. Such calculation may be made in determining the position of an object next to a computing device, so as show corresponding motion of a pointer or other item in a GUI on the device.

In the figure, a section of a periphery of a wearable computing device 302 is shown, which in the illustrative example, includes two sensor-emitter pairs 304, 306. In the illustrative diagram 300, a user has placed an object 308 in a detection area 310 created by the sensor-emitter pairs 304, 306. The sensor-emitter pairs 304, 306 may calculate their respective distances from the object 308 by measuring the amount of light reflected from the object. For example, in some implementations, the sensor-emitter pairs 304, 306 may comprise an LED and photodiode. The LED may create a detection area (area 310 in the current example) by transmitting light into the area adjacent to the device 302. This area may be monitored by the photodiode. When the photodiode notices a change above a predetermined threshold in the amount of light detected, the photodiode may transmit a signal to the device indicating that an object is in the detection area. The intensity of the reflected light may indicate the distance of the object from the sensor-emitter pairs 304, 306.

Once the distance between each of the sensor-emitter pairs 304, 306 and the object 308 has been determined, the X-Y coordinates of the object $(X_2, Y_2)$ can be computed. In some implementations, the X-Y coordinates of the upper sensor 304 and the lower sensor 306 are known and may be stored as constants in the memory of the device 302 along with the distances between the object and the sensor 304, 306, $Z_0$ and $Z_1$, respectively. The coordinates of the sensors 304, 306 and the distances between the sensors 304, 306 and the object 308, may be used to calculate the X-Y coordinates of the object 308. For example, the X-Y coordinates of the upper sensor 304 may be (0,0), while the coordinates of the lower sensor 306 may be $(0, Y_1)$, where $Y_1$ is a known constant. Applying the Pythagorean theorem to the triangle formed by the sensors 304, 306 and the object 308 leads to following set of equations:

$$Z_0^2 = X_2^2 + Y_2^2 \tag{1}$$

$$Z_1^2 = X_2^2 + (Y_2 - Y_1)^2. \tag{2}$$

Values for the known constants $(Z_0, Z_1, \text{ and } Y_1)$ may be substituted into these equations and the equations may be solved for the coordinates of the object 308, $X_2$ and $Y_2$.

Figure 4:
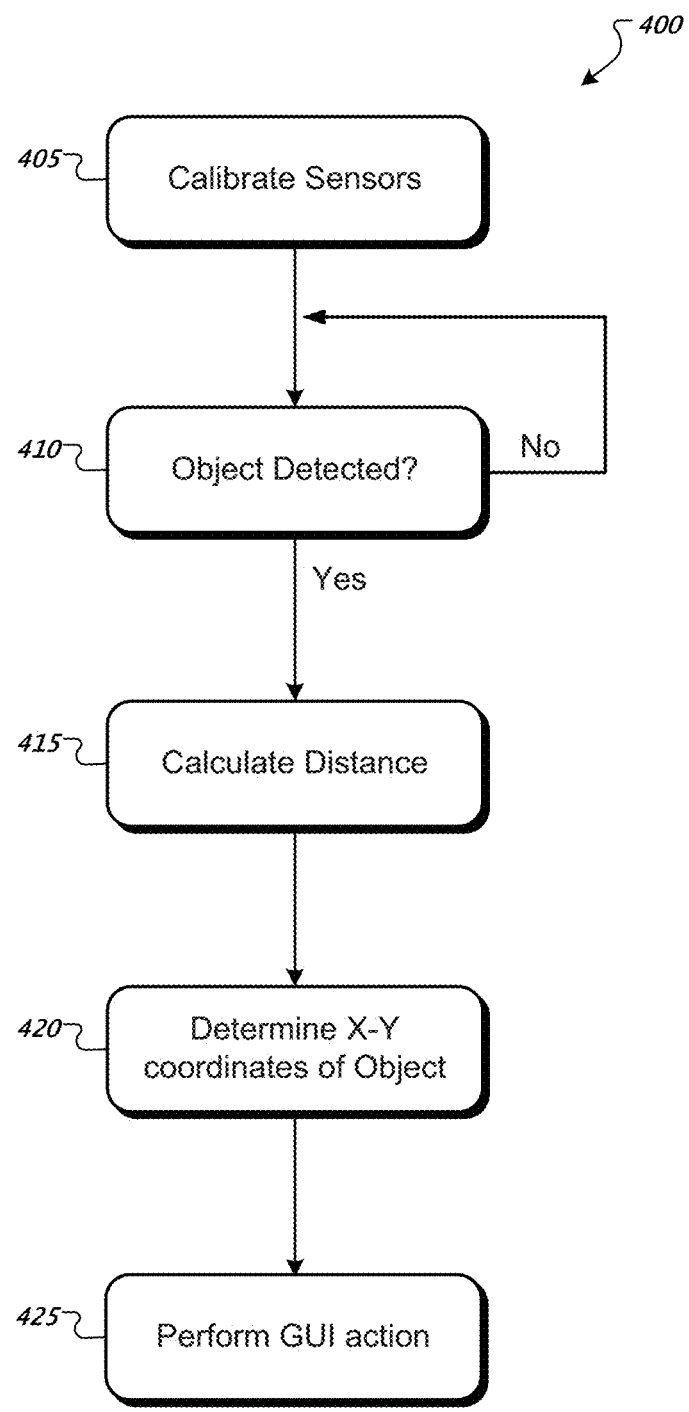
FIG. 4 is a flow chart of an example process for gesture-based device input.
Figure 5:
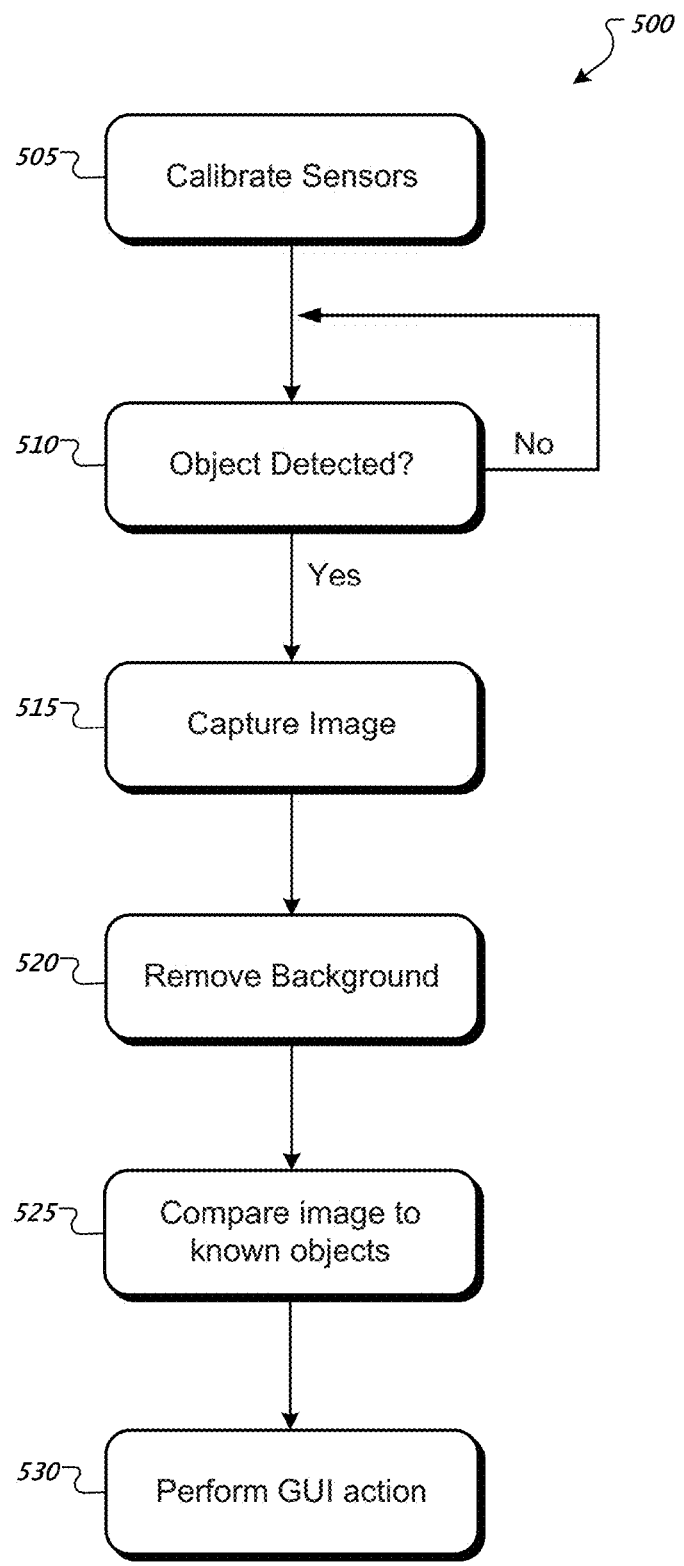
FIG. 5 is a flow chart of an example alternative process for gesture-based device input.

FIGS. 4 and 5 are flow charts of example processes 400 and 500 for gesture-based device input. The processes 400 and 500 may be performed, for example, by a system such as the system 200 and, for clarity of presentation, the description that follows uses the system 200 and the conceptual diagram 100 as the basis of an example for describing the processes. However, another system, or combination of systems, may be used to perform the processes 400 and 500.

Referring to FIG. 4, the illustrative gesture-based input process 400 begins at step 405 where the sensors are calibrated. A baseline intensity level of detected light may be obtained by measuring the amount of light observed by the sensor-emitter pairs 204 under ordinary operating conditions. For example, the device may be placed outdoors and then the device can measure the amount of light detected by the sensor-emitter pairs 204. The amount of light measured can be used in future comparisons to determine whether the amount of light detected as changed, which may be an indication that an object has entered a detection area. In some implementations, the device 202 may periodically re-calibrate itself to adjust to changing operating conditions.

The method may proceed to step 410 where the device 202 determines whether an object has been detected. For example, the sensor-emitter pairs 204 may measure the amount of light detected at regular intervals and compare the amount of detected light with the baseline light intensity level. If the amount of detected light has changed more than a specified amount from the baseline, the sensor-emitter pairs 204 may transmit a signal to the device's processor 206 indicating that an object has entered the detection area. If not, step 410 is repeated.

Once an object has been detected, the distance from the sensor-emitter pairs 204 to the object may be calculated at step 415. For example, the intensity of the reflected light may be used to estimate the distance between each sensor-emitter pair 204 and the object. Knowing these distances, the X-Y coordinates of the object may be computed at step 420. As noted above in regards to FIG. 3, the distances determined at step 415, along with the coordinates of the sensor-emitter pairs 204 may be used to solve equations (1) and (2) above for the X-Y coordinates of the object.

The method may then proceed to step 425 where a GUI action is performed. For example, the pointing device of the GUI may be moved to the X-Y coordinates of the detected object. In some implementations, if the object has been detected at the same location for a predetermined amount of time, a right-click or similar action may be performed at the X-Y coordinates in the GUI that correspond to the location of the object.

In implementations where the sensor-emitter pairs 204 are offset from one another the device may execute a tap command at the calculated X-Y coordinates. For example, if a lower sensor detects an object before an upper sensor does, the sensor-emitter pairs may transmit a signal to the device's processor 206 indicating that a tap has been performed. In response, the GUI may execute a tap command at the calculated coordinates.

FIG. 5 illustrates an alternative gesture-based input process 500. Like the process 400 described above, process 500 begins by calibrating the sensor-emitter pairs 204 at step 505 and then enters an object-detection loop at step 510. When an object is detected at step 510, the process proceeds to step 515 where an image is captured. For example, in some implementations the sensor-emitter pairs 204 may include a CCD camera. When an object is detected at step 510, a signal may be transmitted to the CCD camera and in response the camera may capture an image of the object.

After the image is captured, the device 202 may process the image. For instance, at step 520 the background of the image may be removed. In some implementations, objects in the field of view of the camera that are relatively stationary may be removed. For example, the current image may be compared with a baseline image or an image taken shortly before the current image. Objects that are constant between the pictures may be removed, leaving the object of interest.

Having removed the background, the process proceeds to step 525 where the resulting image is compared to known objects. For example, the image may be compared with images of objects stored in memory 218. If a match is found, an action associated with the image may be performed at step 530. For example, placing a coin in the detection area may result in the device 202 executing a calculator program. In some implementations, if the object does not have an associated image, an action may be dynamically associated with the object. For example, the user may be presented with a list of possible actions when an unidentified object is detected. Selecting an action may associate that action with the object.

Figure 6:
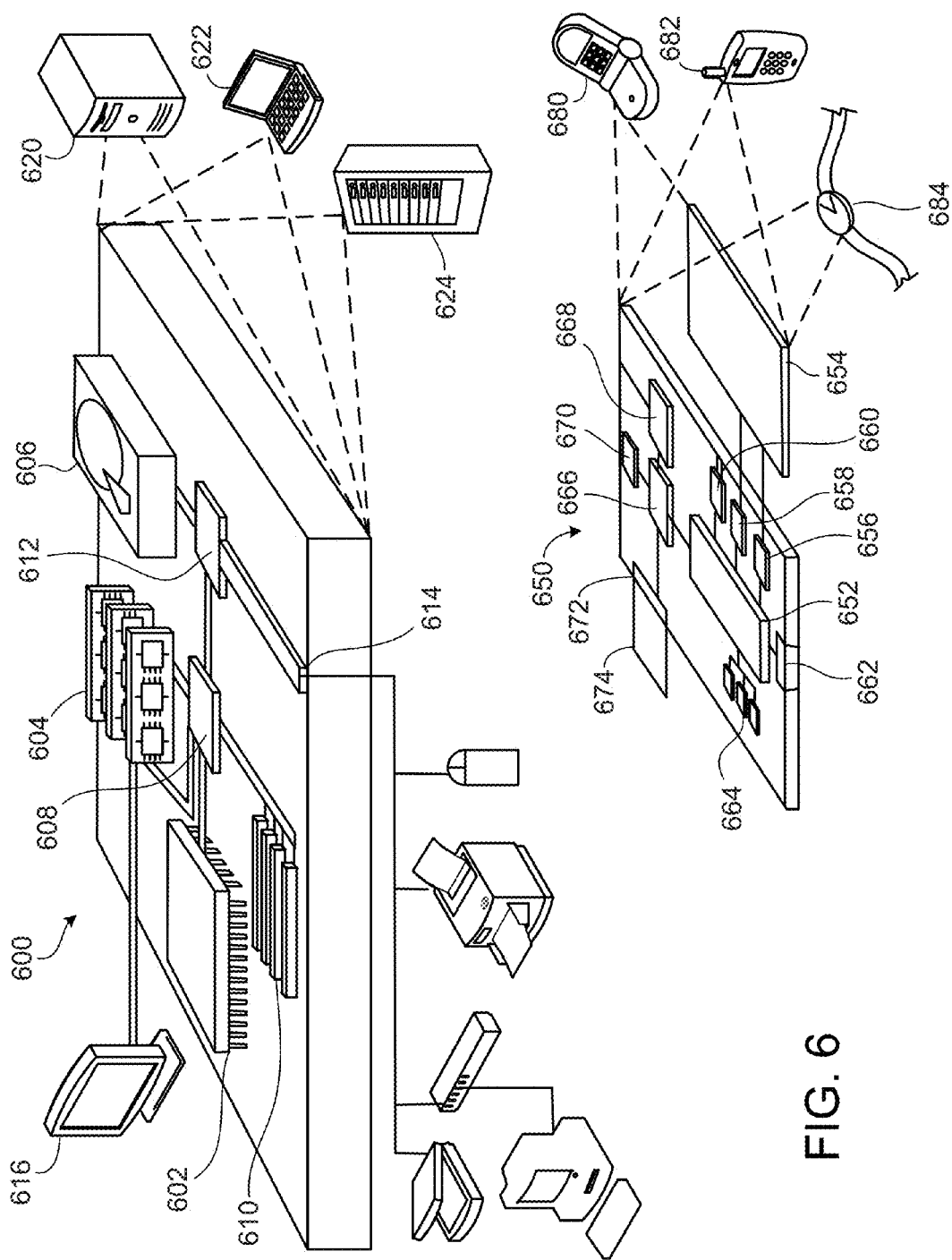
FIG. 6 shows an example of a generic computer device and a generic mobile computer device, which may be used with the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, watch 684, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to a wristwatch form factor, but other forms of devices may be addressed.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
   displaying, by a device that is being worn by a user, a graphical user interface;
   determining, by the device, that a detection area on a surface of the user's body has been contacted;
   identifying, by the device and in response to determining that the detection area on the surface of the user's body has been contacted, a gesture performed in the detection area on the surface of the user's body; and
   performing, by the device and in response to identifying the gesture performed in the detection area on the surface of the user's body, one or more operations that correspond to the identified gesture.

2. The computer-implemented method of claim 1, further comprising determining a path that is being traced by the gesture in the detection area on the surface of the user's body, wherein performing the one or more operations that correspond to the identified gesture comprises changing the display of the graphical user interface in coordination with the path that is being traced by the gesture.

3. The computer-implemented method of claim 1, wherein determining that the detection area on the surface of the user's body has been contacted comprises receiving an indication, from one or more sensors included in a body of the device, that an object has entered the detection area.

4. The computer-implemented method of claim 3, further comprising:
   illuminating, using one or more light sources included in the body of the device, the detection area on the surface of the user's body; and
   monitoring, using the one or more sensors included in the body of the device, light reflected from the detection area,
   wherein receiving the indication that the object has entered the detection area comprises receiving information about the light reflected from the detection area.

5. The computer-implemented method of claim 4, wherein the one or more light sources comprise one or more light emitting diodes, and wherein the one or more sensors comprise one or more photodiodes.

6. The computer-implemented method of claim 1, wherein identifying the gesture comprises identifying a tapping motion performed on the surface of the user's body in the detection area, the method further comprising:
   in response to identifying the tapping motion performed on the surface of the user's body in the detection area, determining one or more operations that correspond to a clicking event; and
   performing the one or more operations that correspond to the clicking event.

7. The computer-implemented method of claim 1, further comprising:
   identifying a plurality of applications on the computing device;
   detecting, using an accelerometer included in the device, motion of the device;
   in response to detecting the motion of the device, selecting one or more applications from the plurality of applications; and
   providing information to the selected one or more applications that indicates the detected motion of the device.

8. The computer-implemented method of claim 1, wherein:
   the device is being worn in a first region of a forearm, wrist, or back of hand of the user,
   the detection area is in a second region of the forearm, wrist, or back of hand of the user, and
   the second region is adjacent to the first region.

9. The computer-implemented method of claim 1, wherein the device includes an electronic display in a body of the device that is being worn by the user, and the graphical user interface is displayed by the electronic display.

10. The computer-implemented method of claim 1, wherein:
    the device comprises a device body and a band that straps the device body to the user, and
    the method further comprises:
       receiving, by the device, an indication that user input has contacted a surface of the band of the device and has performed a second gesture on the surface of the band; and
       in response to receiving the indication that user input has contacted the surface of the band of the device and performed the second gesture, changing the display of the graphical user interface based on the second gesture.

11. The computer-implemented method of claim 1, wherein identifying the gesture performed in the detection area on the surface of the user's body comprises identifying that an object has been dragged from a first location in the detection area to a second location in the detection area on the surface of the user's body.

12. The computer-implemented method of claim 1, wherein a location of the detection area on the surface of the user's body is separated by a non-zero distance from a location at which the device that is worn by the user contacts the user.

13. The computer-implemented method of claim 1, wherein the detection area on the surface of the user's body is located adjacent to a body of the device when the device is worn by the user.

14. A system comprising:
   a wearable computing device that includes a device body;
   one or more sensors that are coupled to the device body of the wearable computing device and that are configured to sense user input in a detection area on a surface of a body of a user who is wearing the wearable computing device;
   a processor in the device body of the wearable computing device that is configured to
      (i) determine, using information sensed by the one or more sensors, that the surface of the body of the user who is wearing the wearable computing device has been contacted in the detection area, and
      (ii) identify, using information sensed by the one or more sensors, a gesture performed in the detection area on the surface of the body of the user who is wearing the wearable computing device; and
   an electronic display that includes a graphical user interface that is configured to change responsive to the processor identifying the gesture performed in the detection area on the surface of the body of the user.

15. The system of claim 14, wherein the detection area comprises an area on a forearm, wrist, or back of hand of the user adjacent to the device body.

16. The system of claim 14, wherein:
   the one or more sensors comprise light detectors that are arranged to measure light reflected from the detection area; and
   the processor is further configured to determine that the surface of the body of the user has been contacted in the detection area in response to an indication from the one or more sensors of a change in the light reflected from the detection area.

17. The system of claim 14, further comprising one or more light sources that are coupled to the device body of the wearable computing device and that are configured to illuminate the detection area.

18. The system of claim 17, wherein the one or more light sources are further configured to superimpose an image of one or more graphical elements onto the detection area on the surface of the body of the user.

19. The system of claim 14, wherein the processor is further configured to identify a path that is being traced by the gesture performed in the detection area on the surface of the body of the user, and to cause the electronic display to move a graphical pointing element displayed in the graphical user interface in coordination with the path that is being traced by the gesture.

20. A computer-implemented method, comprising:
   displaying, by a device, a graphical user interface, the device having a flexible band that straps the device to a user;
   determining, by the device, that a surface of the band has been contacted;
   identifying, by the device and in response to determining that the surface of the band has been contacted, a gesture performed on the surface of the band; and
   changing, based on the identified gesture performed on the surface of the band, the display of the graphical user interface of the device.

21. The computer-implemented method of claim 20, wherein the device comprises a watch being worn on a forearm, wrist, or back of hand of the user, and wherein the band includes one or more sensors that the device is configured to use to determine whether the surface of the band has been contacted and to identify the gesture performed on the surface of the band.

22. The computer-implemented method of claim 21, wherein changing the display of the graphical user interface of the device comprises sensing a dragging motion performed on the surface of the band and moving a graphical pointing element displayed in the graphical user interface in coordination with the sensed dragging motion on the surface of the band.

* * * * *